United States Patent [19]
Nishio

[11] Patent Number: 5,812,897
[45] Date of Patent: Sep. 22, 1998

[54] CARTRIDGE LOADING/EJECTING APPARATUS

[75] Inventor: Tetsuya Nishio, Kawasaki, Japan

[73] Assignee: Canon Kabushiki Kaisha, Tokyo, Japan

[21] Appl. No.: 746,839

[22] Filed: Nov. 18, 1996

[30] Foreign Application Priority Data

Nov. 21, 1995 [JP] Japan .................................. 7-302720

[51] Int. Cl.⁶ .................................................. G03B 17/02
[52] U.S. Cl. .................................................. 396/538
[58] Field of Search .............................................. 396/538

[56] References Cited

U.S. PATENT DOCUMENTS 5,477,295 12/1995 Lawther et al. ......................... 396/538
5,612,760 3/1997 Okuno ..................................... 396/538

*Primary Examiner*—David M. Gray
*Attorney, Agent, or Firm*—Robin, Blecker & Daley

[57] ABSTRACT

An apparatus or a camera comprises a first unloading device which moves a cartridge in an unloading direction to at least a first unloading position, and a second unloading device which moves the cartridge moved in the unloading direction by the first unloading device, in the unloading direction to at least a second unloading position.

43 Claims, 13 Drawing Sheets

CARTRIDGE LOADING/EJECTING APPARATUS

BACKGROUND OF THE INVENTION

1. Field of the Invention

The present invention relates to an Improvement in an apparatus which loads/ejects (unloads) a film cartridge or the like.

2. Description of Related Art

An apparatus which automatically loads/ejects a film cartridge into/from a camera by the driving force of a roller has heretofore been proposed by Japanese Laid-Open Patent Application No. Hei 7-199336, etc.

However, in such an apparatus, if a large load occurs in the operation of engaging a film rewinding fork of the camera with the film cartridge during loading thereof or in the operation of disengaging the film rewinding fork of the camera from the film cartridge during unloading thereof, the roller may slip on the film cartridge and the film cartridge may become unable to be loaded or unloaded, because the driving force of the roller is transmitted to the film cartridge by friction.

BRIEF SUMMARY OF THE INVENTION

One aspect of the present invention is to provide an apparatus or a camera which comprises a first unloading device which moves a cartridge in an unloading direction to at least a first unloading position, and a second unloading device which moves the cartridge moved in the unloading direction by the first unloading device, in the unloading direction to at least a second unloading position, so that the cartridge can securely be unloaded.

Other aspects of the present invention will become apparent from the following detailed description of a preferred embodiment of the present invention, taken in conjunction with the accompanying drawings.

BRIEF DESCRIPTION OF THE SEVERAL VIEWS OF THE DRAWING

FIG. 12 is a flowchart of the control circuit shown in FIG. 11; and.

DETAILED DESCRIPTION OF THE INVENTION

A preferred embodiment of the present invention will be described below with reference to the accompanying drawings.

Figure 1:
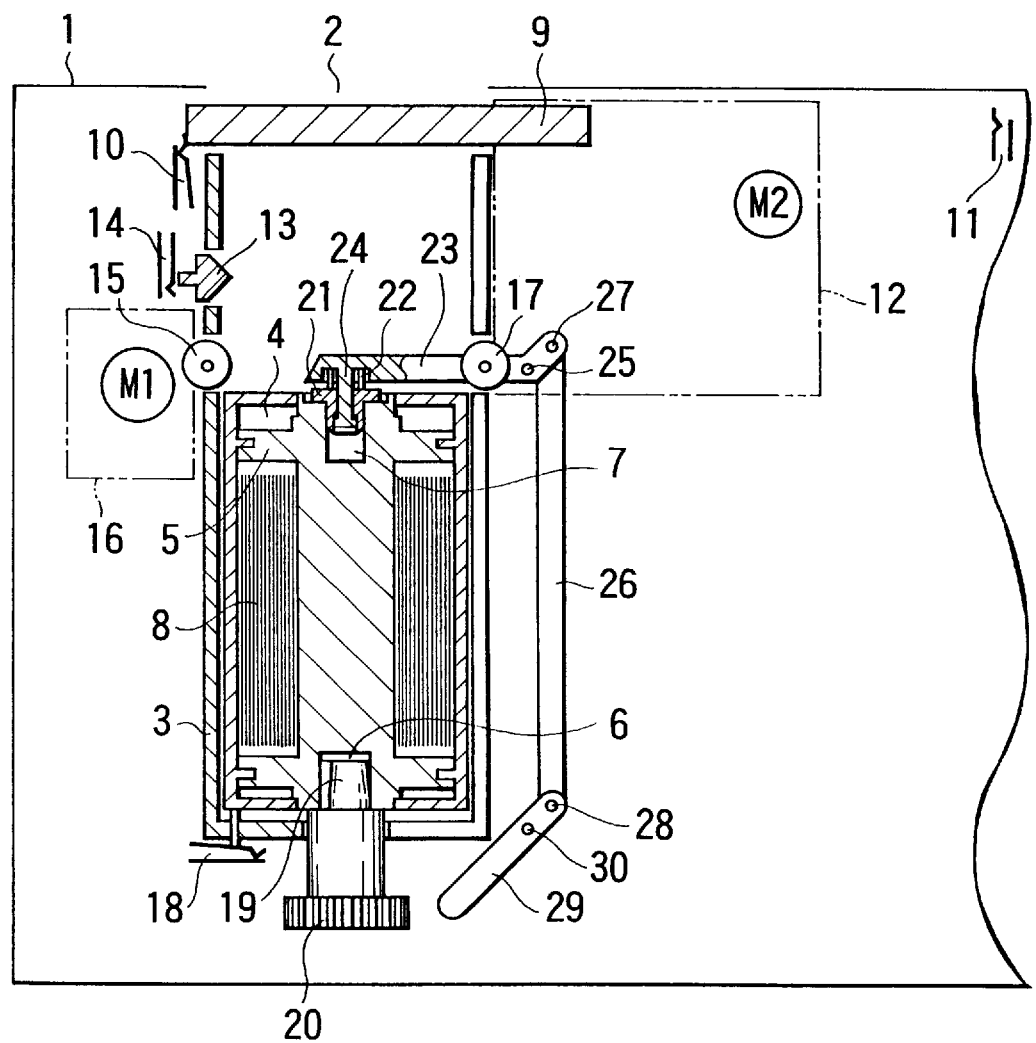
FIG. 1 is a diagrammatic view of a cartridge loading/ejecting apparatus according to a preferred embodiment of the present invention.

FIG. 1 is a diagrammatic view of a cartridge loading/ejecting apparatus for a camera according to an embodiment of the present invention. FIGS. 2 to 10 are diagrammatic views showing the operating process of the apparatus shown in FIG. 1.

Referring to FIG. 1, a cartridge loading/ejecting apparatus 1 includes a cartridge inserting port 2 and a cartridge chamber 3. A film cartridge 4 accommodated in the cartridge chamber 3 includes a film winding spool 5 provided in the film cartridge 4, a winding-shaft engagement hole 6 provided in the film winding spool 5 at one end thereof, a support-shaft engagement hole 7 provided in the film winding spool 5 at the other end thereof, and a film 8 accommodated in the film cartridge 4. The cartridge loading/ejecting apparatus 1 also includes a cartridge chamber lid 9 which is operative to open and close the cartridge inserting port 2, a closing-of-lid detecting switch 10, an opening-of-lid detecting switch 11, a lid driving device 12 which causes a motor M2 to interlockingly move the cartridge chamber lid 9 and a support lever 23 via a speed reducing gear train (not shown), an insertion-of-cartridge detecting member 13, an insertion-of-cartridge detecting switch 14, a driving roller 15 made of an elastic material such as rubber, a roller driving device 16 which causes a motor M1 to rotate the driving roller 15 via a speed reducing gear train (not shown), and a follower roller 17 made of an elastic material, such as rubber. The film cartridge 4 is clamped between the driving roller 15 and the follower roller 17 so that insertion or ejection of the film cartridge 4 is effected by the friction-member action of the driving roller 15 by causing the driving roller 15 to rotate. The cartridge loading/ejecting apparatus 1 also includes a completion-of-cartridge-insertion detecting switch 18, a driving shaft 19 and a driving shaft gear 20. The driving shaft 19 is brought into engagement with the winding-shaft engagement hole 6 of the film winding spool 5 and a driving device (not shown) rotates the driving shaft gear 20 to advance and rewind the film 8.

The cartridge loading/ejecting apparatus 1 also includes a support shaft 21 arranged to engage with the support-shaft engagement hole 7 of the film winding spool 5, a pressure spring 22, a support lever 23 for supporting the support shaft 21, and a shaft 24 fitted in the support shaft 21. The support shaft 21 which is urged downward by the pressure spring 22 is fitted on the shaft 24 for sliding movement in downward and upward directions.

The support lever 23 is supported for rotation about a shaft 25, and the lid driving device 12 causes the support lever 23 to rotate between the position shown in FIG. 1 and a position which is clockwise spaced apart from that position by a rotational angle of approximately 90°. An ejecting lever 29 is supported for rotation about a shaft 30. The support lever 23 and the ejecting lever 29 are interconnected at shafts 27 and 28 by a connecting lever 26 so that the support lever 23 and the ejecting lever 29 move interlockingly.

Figure 11:
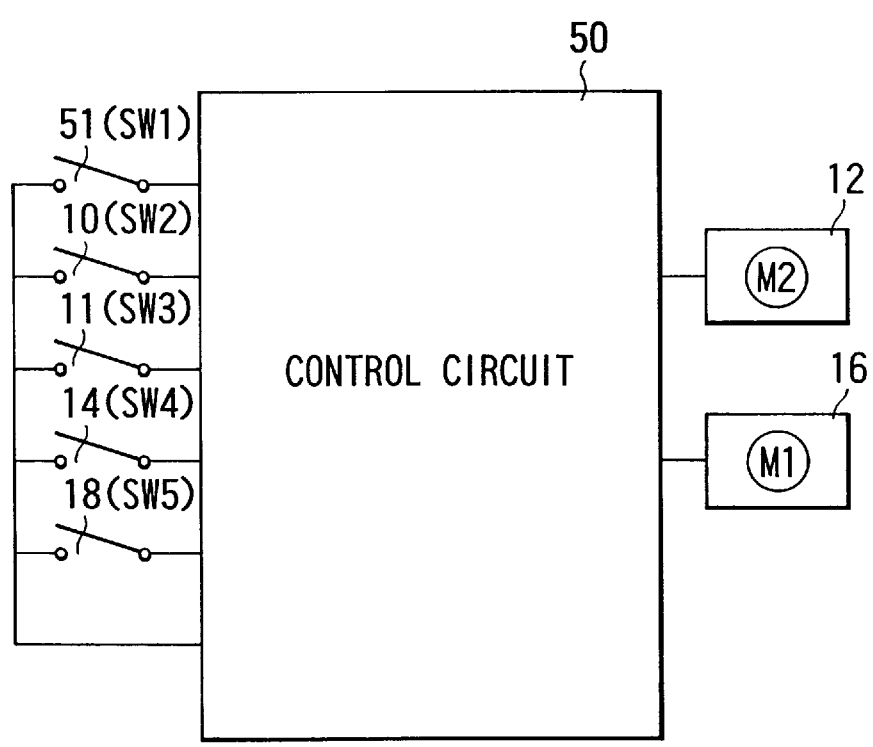
FIG. 11 is a circuit block diagram of the apparatus of FIG. 1.

FIG. 11 is a circuit block diagram of the apparatus of FIG. 1. The circuit shown in FIG. 11 includes a control circuit 50, which is composed of a microcomputer, a memory and other constituent elements, a start switch 51 (SW1) which is turned on to start a sequence of insertion or ejection of the film cartridge 4, the closing-of-lid detecting switch 10 (SW2), the opening-of-lid detecting switch 11 (SW3), the insertion-of-cartridge detecting switch 14 (SW4), and the completion-of-cartridge-insertion detecting switch 18 (SW5).

Figure 12:
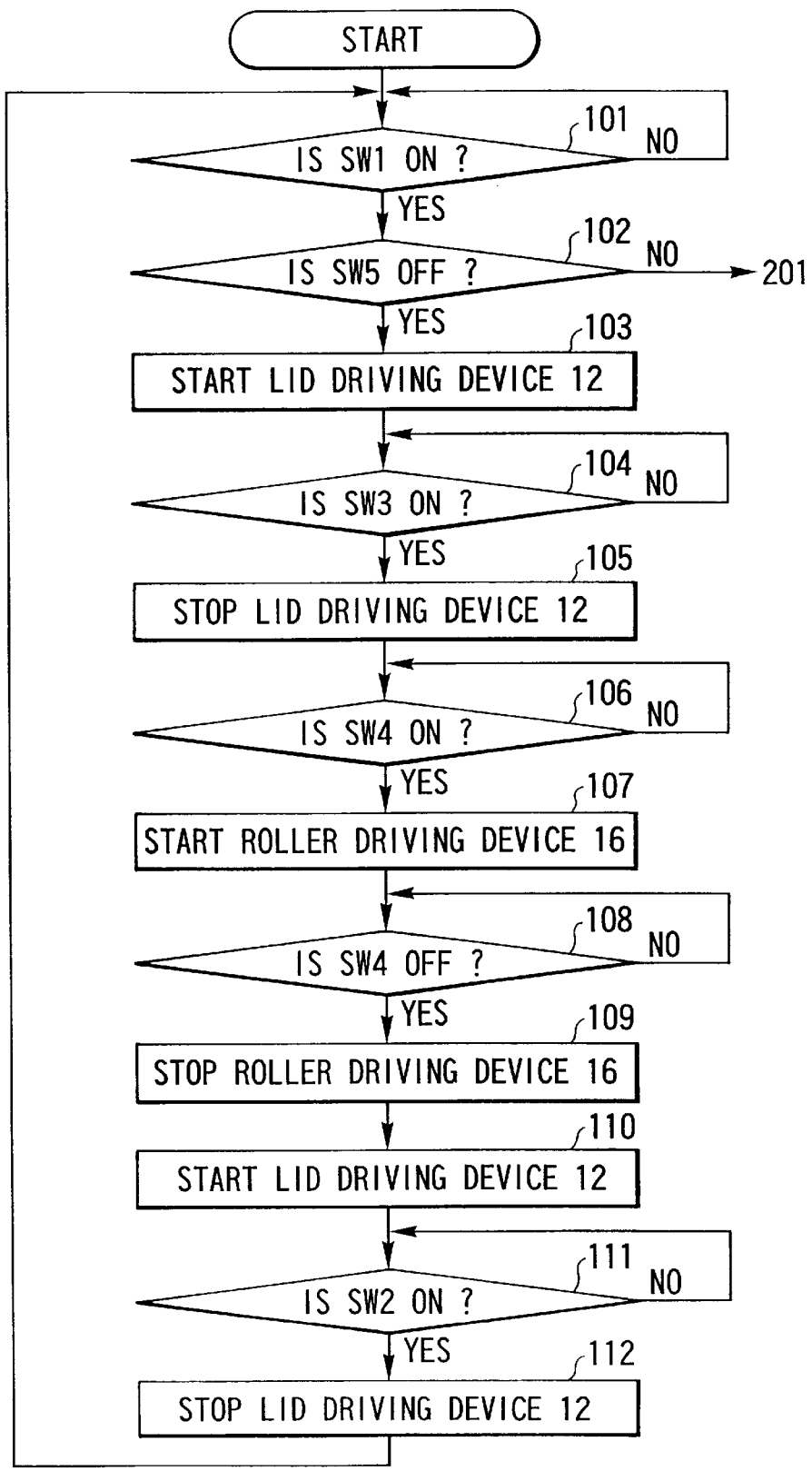
Figure 13:
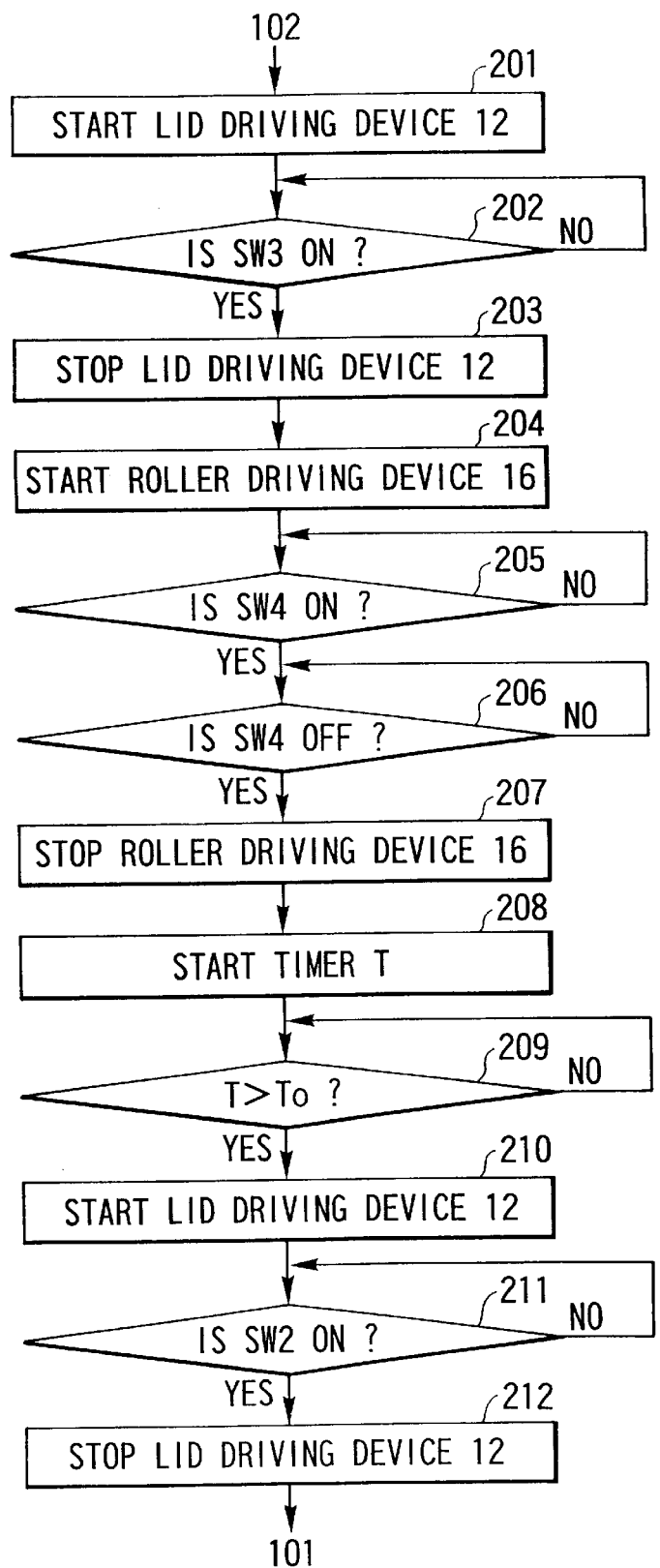
FIG. 13 is a continuing flowchart of the control circuit shown in FIG. 11.

The operation of the above-described arrangement will be described below with reference to the flowchart shown in FIGS. 12 and 13, which is processed by the control circuit 50.

(1) Cartridge Loading Operation

Figure 2:
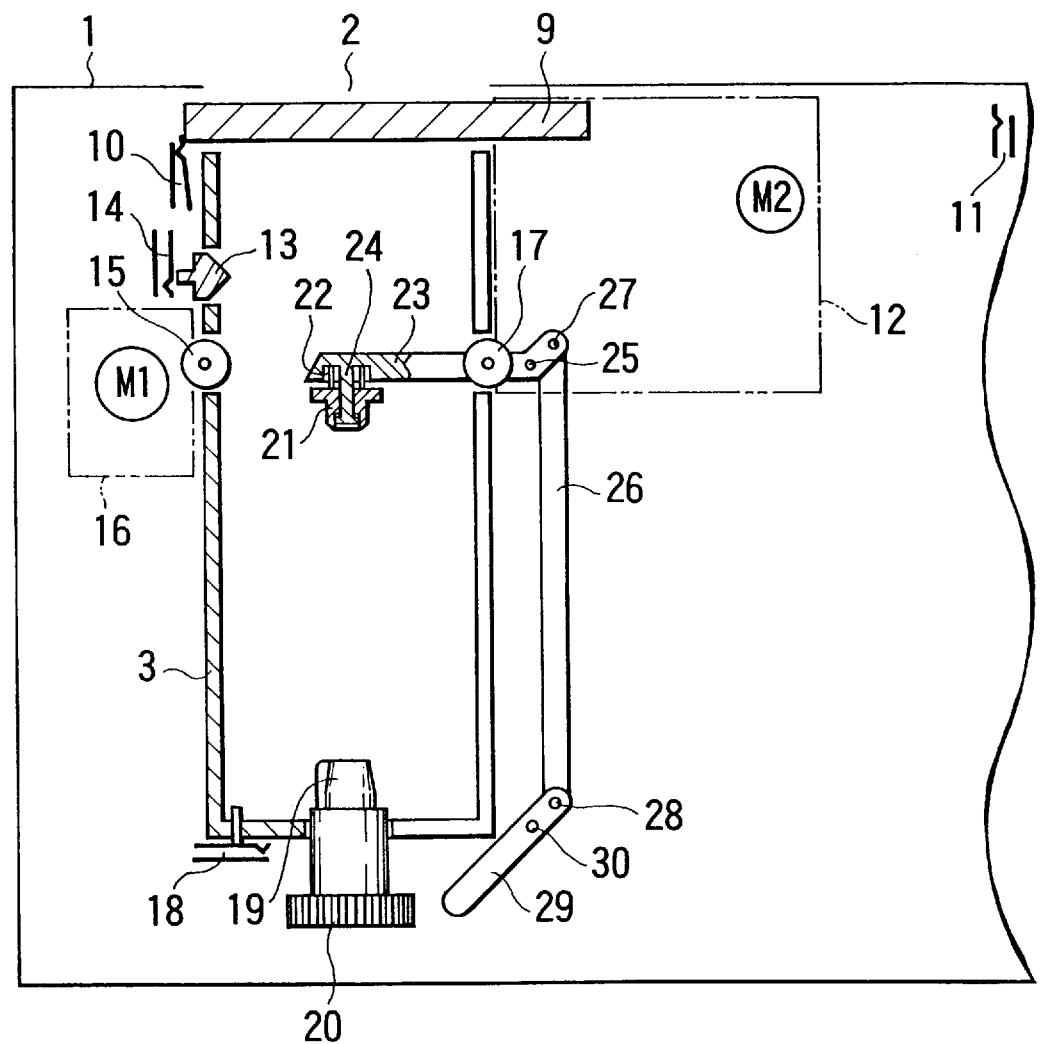
FIG. 2 is a diagrammatic view showing one step of the operating process of the apparatus of FIG. 1.

The cartridge loading operation is started when the cartridge loading/ejecting apparatus 1 is in the state shown in FIG. 2, i.e., before the film cartridge 4 is inserted into the cartridge loading/ejecting apparatus 1.

If the start switch 51 is turned on by an operator and the control circuit 50 detects that fact, the process proceeds from Step 101 to Step 102, in which the control circuit 50 determines the state of the completion-of-cartridge-insertion detecting switch 18 (SW5). Since the film cartridge 4 is not inserted in the cartridge loading/ejecting apparatus 1 and the completion-of-cartridge-insertion detecting switch 18 is off, the process proceeds to Step 103, in which the control circuit 50 starts a cartridge loading sequence.

In Step 103, the control circuit 50 starts the operation of the lid driving device 12 to move the cartridge chamber lid 9 in the rightward direction in which to open the cartridge chamber lid 9, as shown in FIG. 2. The support lever 23 rotates about the shaft 25 in the clockwise direction in interlocking relation to the movement of the cartridge chamber lid 9. With the movement of the support lever 23, the ejecting lever 29 is rotated about the shaft 30 in the clockwise direction by the connecting lever 26.

Figure 3:
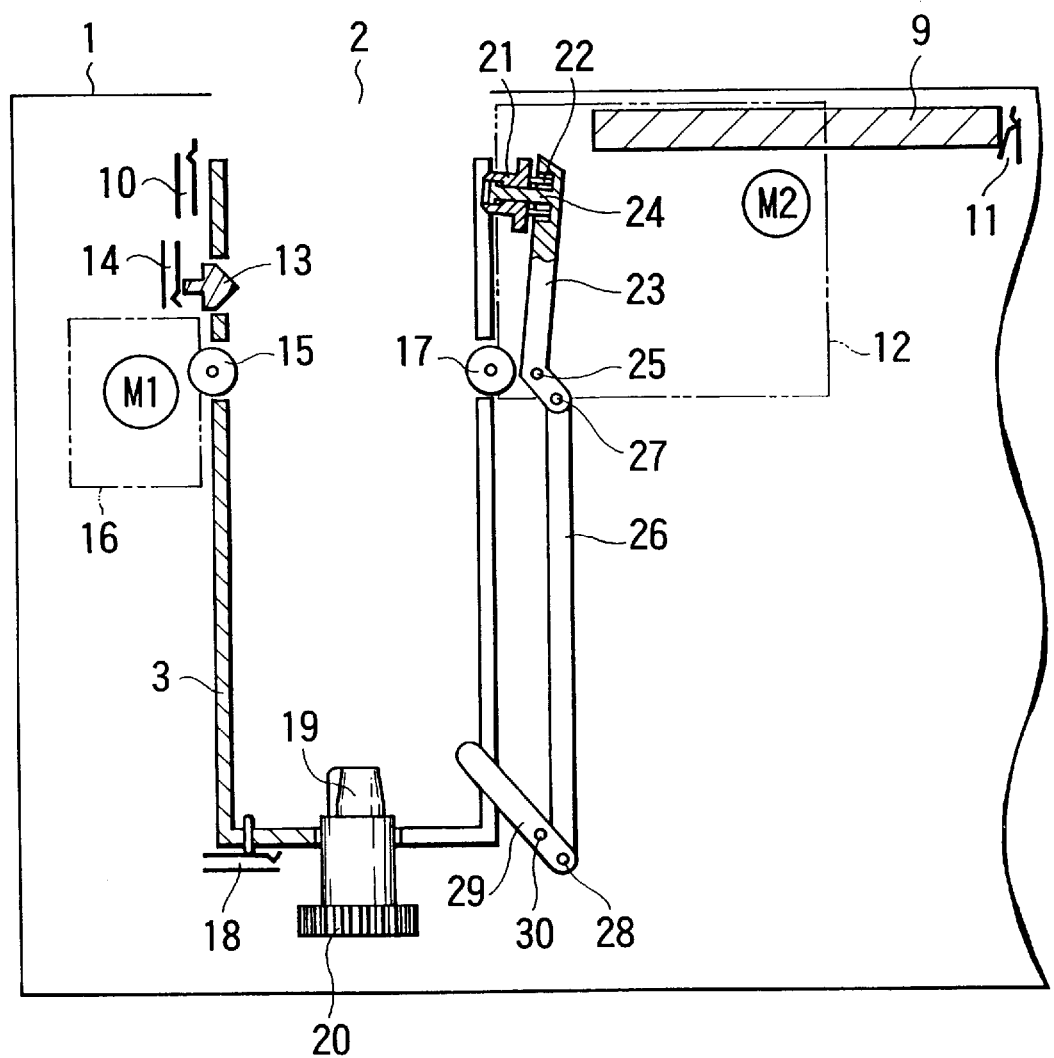
FIG. 3 is a diagrammatic view showing another step of the operating process of the apparatus of FIG. 1.
Figure 4:
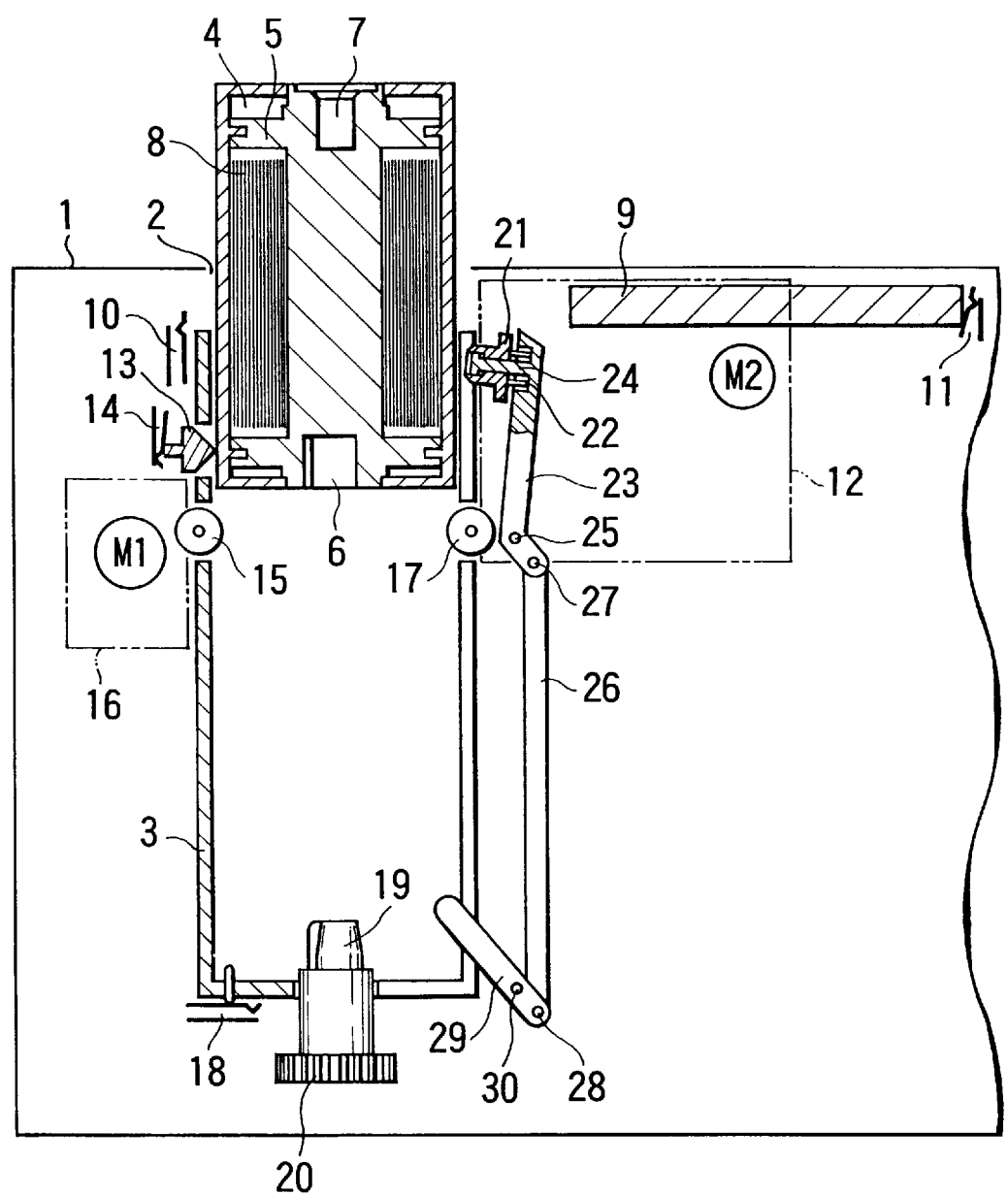
FIG. 4 is a diagrammatic view showing another step of the operating process of the apparatus of FIG. 1.

When the cartridge chamber lid 9 completes its opening operation as shown in FIG. 3, the opening-of-lid detecting switch 11 (SW3) is turned on by being pressed by the cartridge chamber lid 9. If the control circuit 50 detects in Step 104 that the opening-of-lid detecting switch 11 (SW3) has been turned on, the process proceeds to Step 105, in which the control circuit 50 stops the operation of the lid driving device 12. At this time, the cartridge chamber lid 9 stops at a position where it does not cover the cartridge inserting port 2. The support lever 23 interlocks with the movement of the cartridge chamber lid 9 and stops at a position where the support shaft 21 does not hinder insertion of the film cartridge 4 into the cartridge chamber 3. The ejecting lever 29 interlocks with the support lever 23 and stops at the position shown in FIG. 3. After that, as shown in FIG. 4, if the operator inserts the film cartridge 4 into the cartridge inserting port 2, as by hand, the film cartridge 4 presses the insertion-of-cartridge detecting member 13 to turn on the insertion-of-cartridge detecting switch 14. If the control circuit 50 detects in Step 106 that the insertion-of-cartridge detecting switch 14 has been turned on, the process proceeds to Step 107, in which the control circuit 50 starts the operation of the roller driving device 16 to rotate the driving roller 15 in the clockwise direction.

Figure 5:
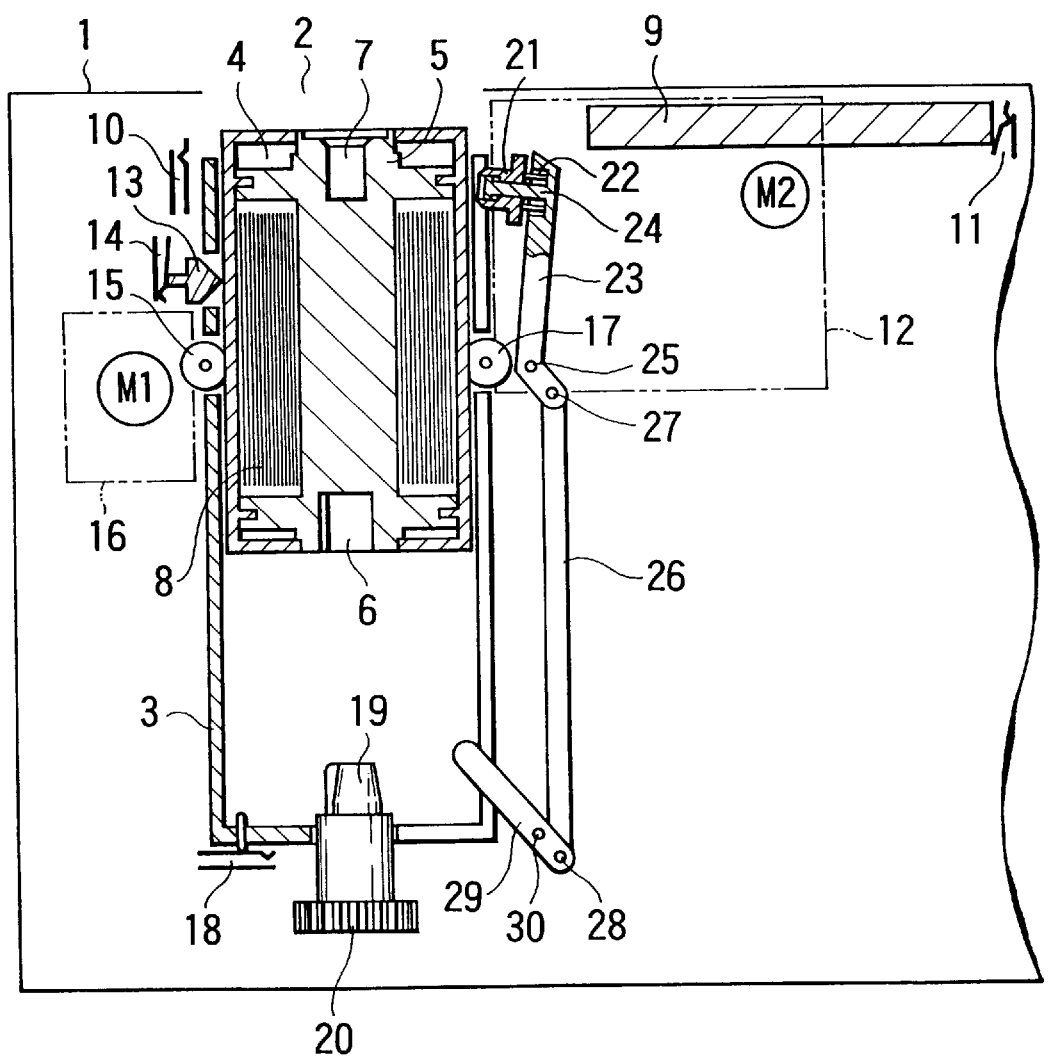
FIG. 5 is a diagrammatic view showing another step of the operating process of the apparatus of FIG. 1.

If the film cartridge 4 is inserted further and comes into contact with the driving roller 15 and the follower roller 17, the film cartridge 4 is clamped between the driving roller 15 and the follower roller 17 as shown in FIG. 5, and is driven to move inward, by the driving roller 15.

Figure 6:
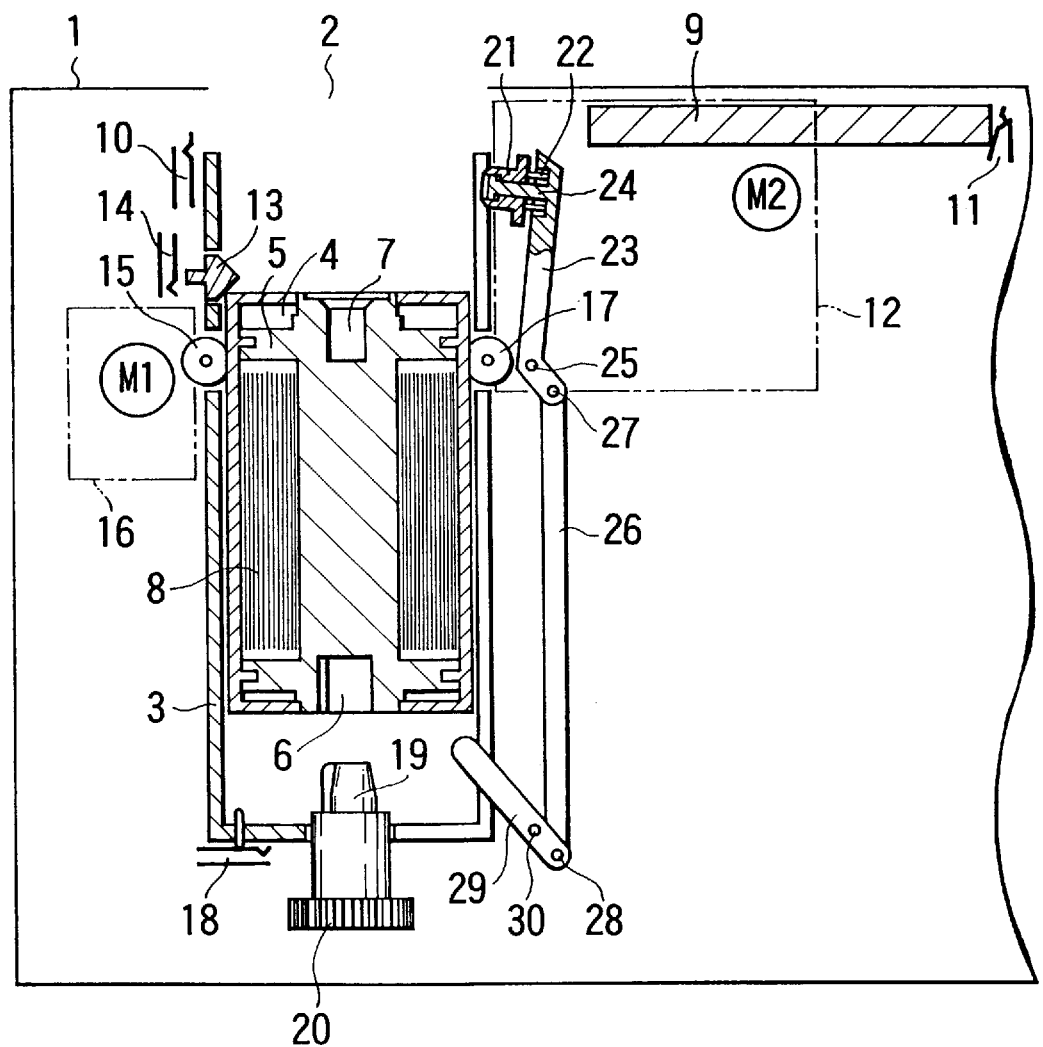
FIG. 6 is a diagrammatic view showing another step of the operating process of the apparatus of FIG. 1.

When the film cartridge 4 reaches the position shown in FIG. 6 and the top face of the film cartridge 4 passes the insertion-of-cartridge detecting member 13, the insertion-of-cartridge detecting member 13 is released from the pressure applied by the film cartridge 4 and is reset by an urging member (not shown) so that the insertion-of-cartridge detecting switch 14 (SW4) is switched from its on state to its off state. If the control circuit 50 detects that the insertion-of-cartridge detecting switch 14 (SW4) has been turned off, the process proceeds to Step 109, in which the control circuit 50 stops the operation of the roller driving device 16.

While the film cartridge 4 is being moved inward by being clamped between the driving roller 15 and the follower roller 17, the film winding spool 5 does not engage with the driving shaft 19. Accordingly, no large force is needed for moving the film cartridge 4 inward, and the film cartridge 4 can be moved inward without causing a slip between the driving roller 15 and the film cartridge 4. In addition, even if the film cartridge 4 is inserted into the cartridge chamber 3 by the operator in the state of projecting from the cartridge inserting port 2 to a large extent, the film cartridge 4 can be moved fully inward by the rollers 15 and 17.

Figure 7:
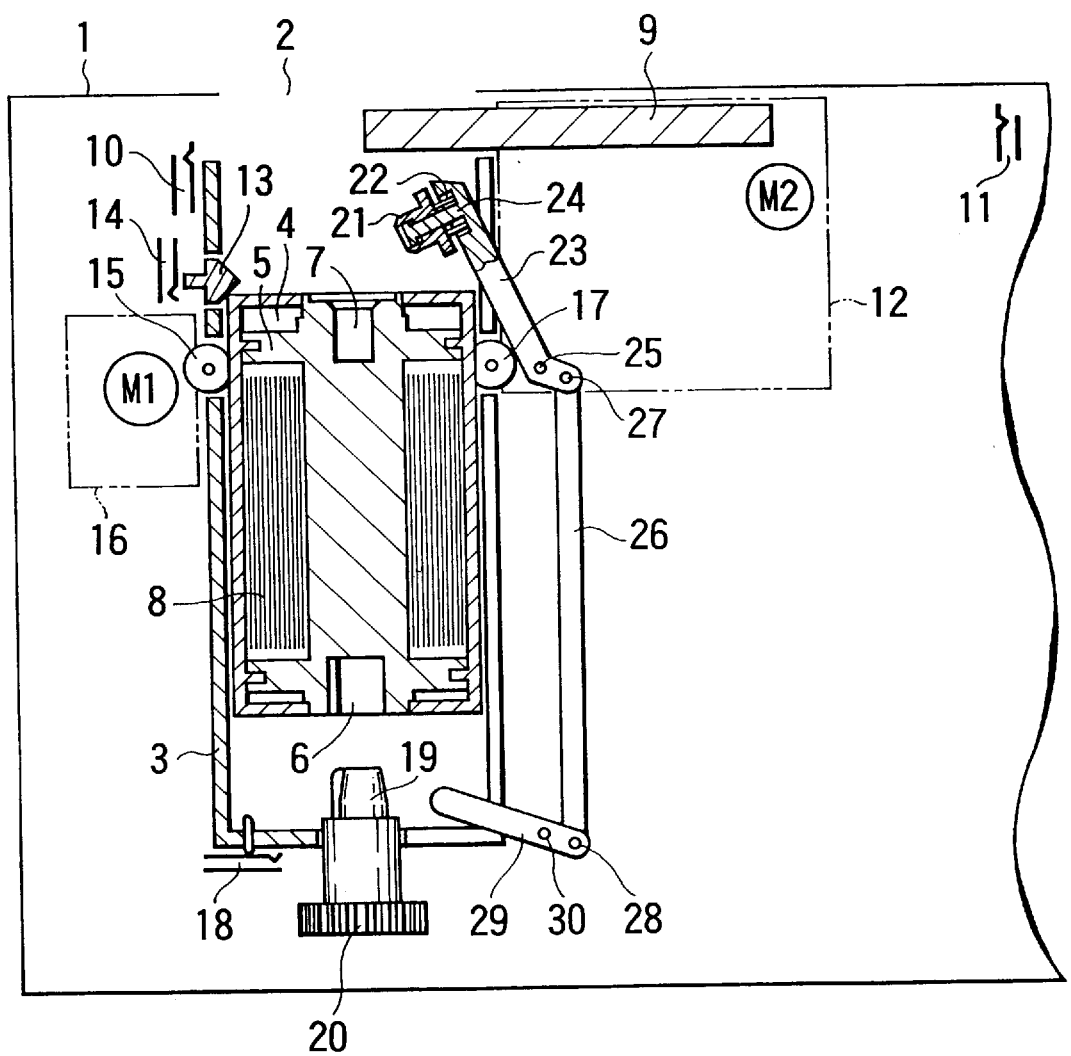
FIG. 7 is a diagrammatic view showing another step of the operating process of the apparatus of FIG. 1.

Then, in Step 110, the control circuit 50 starts the operation of the lid driving device 12 to move the cartridge chamber lid 9 in the leftward direction in which to close the cartridge chamber lid 9, as shown in FIG. 7. The support lever 23 rotates about the shaft 25 in the counterclockwise direction in interlocking relation to the movement of the cartridge chamber lid 9. With the movement of the support lever 23, the ejecting lever 29 is rotated about the shaft 30 in the counterclockwise direction by the connecting lever 26. The film cartridge 4 is held at the position shown in FIG. 7 until the support shaft 21 comes into contact with the film winding spool 5.

Figure 8:
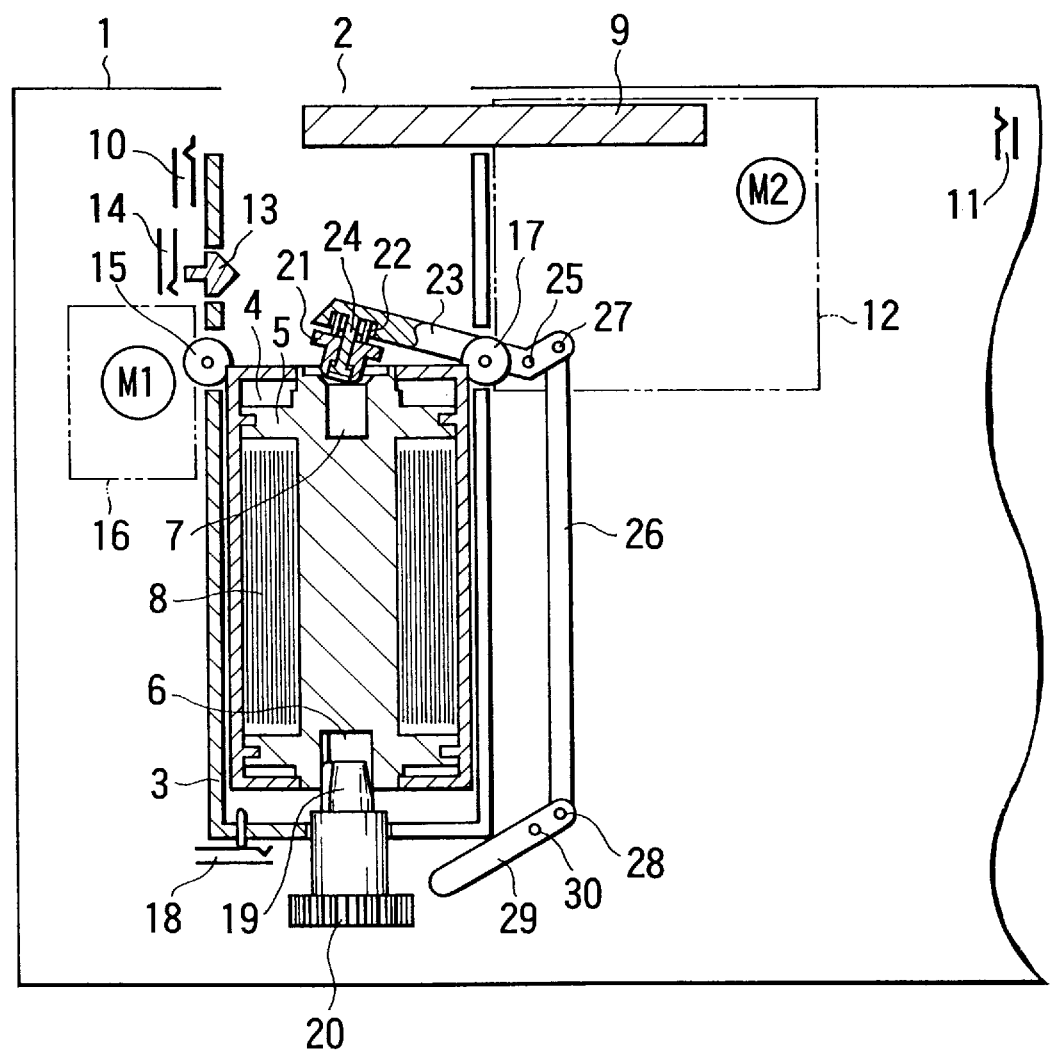
FIG. 8 is a diagrammatic view showing another step of the operating process of the apparatus of FIG. 1.

As shown in FIG. 8, when the cartridge chamber lid 9 moves further toward the left, the support lever 23 rotates in the counterclockwise direction in interlocking relation to the movement of the cartridge chamber lid 9 and the support shaft 21 comes into contact with the film winding spool 5. When the support lever 23 rotates further in the counterclockwise direction, the support shaft 21 presses the film winding spool 5 so that the film cartridge 4 is pressed downward. At this time, since the support shaft 21 fitted to the support lever 23 directly presses the film winding spool 5, the support shaft 21 can apply to the film winding spool 5 the large force required for the film winding spool 5 to engage with the driving shaft 19. With the movement of the support lever 23, the ejecting lever 29 is rotated in the counterclockwise direction by the connecting lever 26, so that the ejecting lever 29 is prevented from coming into contact with the film cartridge 4.

When the cartridge chamber lid 9 is completely closed and the loading of the film cartridge 4 is completed as shown in FIG. 1, the closing-of-lid detecting switch 10 is turned on by being pressed by the cartridge chamber lid 9. If the control circuit 50 detects in Step 111 that the closing-of-lid detecting switch 10 has been turned on, the process proceeds to Step 112, in which the control circuit 50 stops the operation of the lid driving device 12 and brings the cartridge loading sequence to an end. Then, the process returns to Step 101, in which the control circuit 50 waits for an input to be supplied from the start switch 51 (SW1).

In the state shown in FIG. 1, the film winding spool 5 is brought in engagement with the driving shaft 19, and the support lever 23 is positioned in interlocking relation to the cartridge chamber lid 9 so that the support shaft 21 is positioned to support the film cartridge 4 in a loading-complete state thereof. Accordingly, the support shaft 21 supports the film winding spool 5 with high positional accuracy. With the movement of the support lever 23, the ejecting lever 29 is retracted to a position where it does not come into contact with the film cartridge 4.

In addition, the film cartridge 4 is out of contact with the driving roller 15 and the follower roller 17, and the completion-of-cartridge-insertion detecting switch 18 is turned on by the film cartridge 4. In this state, the film cartridge 4 is supported at the film winding spool 5 by the driving shaft 19 and the support shaft 21 and no pressure is externally applied to the case of the film cartridge 4. When the film cartridge 4 is in this state, even if the film 8 is transported, the film winding spool 5 is not adversely affected, because no pressure is externally applied to the case of the film cartridge 4.

(2) Cartridge Ejecting Operation

The cartridge ejecting operation is started when the film cartridge 4 is inserted in the cartridge loading/ejecting apparatus 1 as shown in FIG. 1.

If the start switch 51 is turned on by the operator and the control circuit 50 detects that fact, the process proceeds from Step 101 to Step 102, in which the control circuit 50 determines the state of the completion-of-cartridge-insertion detecting switch 18 (SW5). Since the film cartridge 4 is inserted in the cartridge loading/ejecting apparatus 1 and the completion-of-cartridge-insertion detecting switch 18 is on, the process proceeds to Step 201, in which the control circuit 50 starts a cartridge ejecting sequence.

Figure 9:
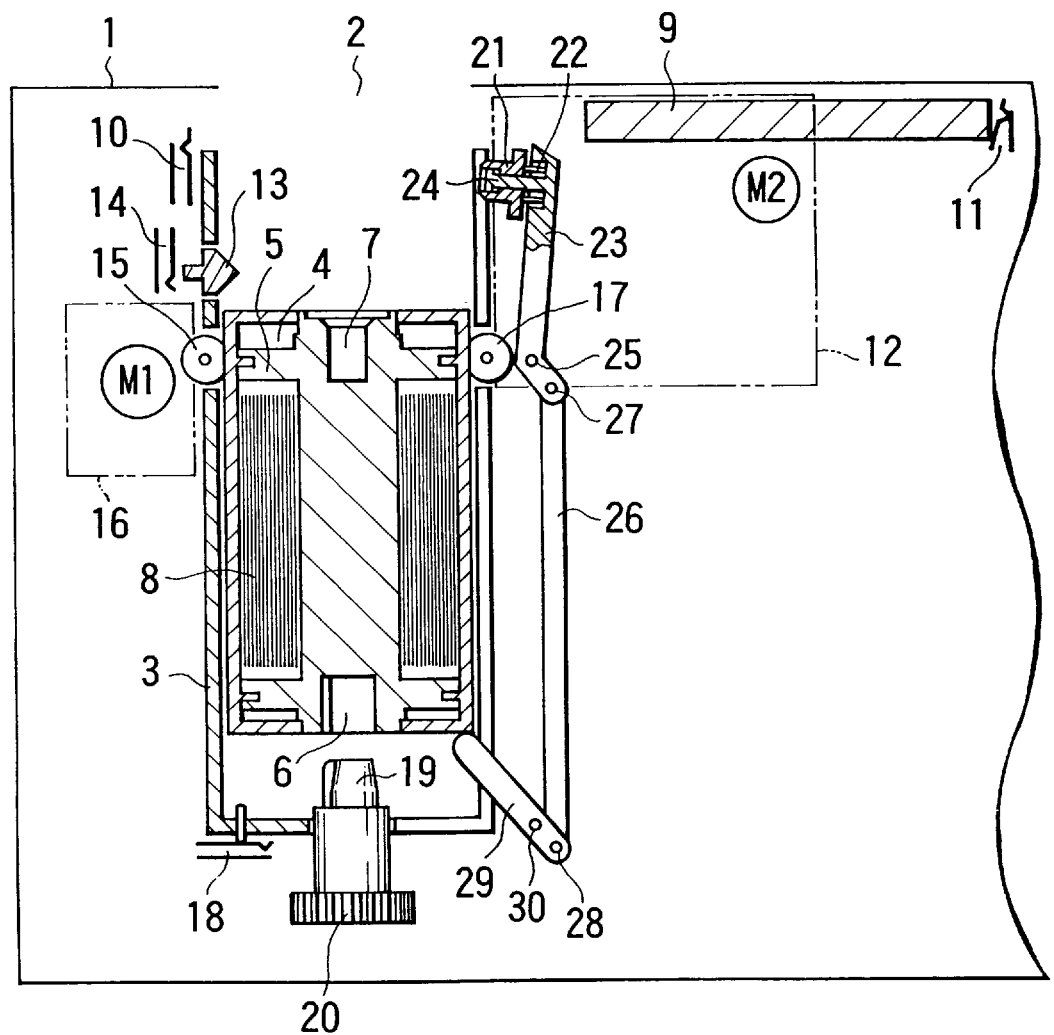
FIG. 9 is a diagrammatic view showing another step of the operating process of the apparatus of FIG. 1.

In Step 201, the control circuit 50 starts the operation of the lid driving device 12 to move the cartridge chamber lid 9 in the rightward direction in which to open the cartridge chamber lid 9, as viewed in FIG. 1. The support lever 23 rotates about the shaft 25 in the clockwise direction in interlocking relation to the movement of the cartridge chamber lid 9. With the movement of the support lever 23, the ejecting lever 29 is rotated about the shaft 30 in the clockwise direction by the connecting lever 26. Thus, the end of the ejecting lever 29 opposite to the shaft 28 comes into contact with the bottom face of the film cartridge 4, and the film cartridge 4 is moved upward by the clockwise rotation of the ejecting lever 29 about the shaft 30. During this time, since the ejecting lever 29 directly presses the bottom face of the film cartridge 4, the ejecting lever 29 can apply to the film cartridge 4 the large force required to release the engagement between the film winding spool 5 and the driving shaft 19. Then, when the cartridge chamber lid 9 completes its opening operation as shown in FIG. 9, the opening-of-lid detecting switch 11 (SW3) is turned on by being pressed by the cartridge chamber lid 9. If the control circuit 50 detects in Step 202 that the opening-of-lid detecting switch 11 (SW3) has been turned on, the process proceeds to Step 203, in which the control circuit 50 stops the operation of the lid driving device 12. At this time, the cartridge chamber lid 9 stops at the position where it does not cover the cartridge inserting port 2. The support lever 23 interlocks with the movement of the cartridge chamber lid 9 and stops at a position where the support shaft 21 does not hinder ejection of the film cartridge 4 from the cartridge chamber 3. The ejecting lever 29 interlocks with the support lever 23 and presses upward the bottom face of the film cartridge 4 so that, as shown in FIG. 9, the film cartridge 4 is moved up to a position where the top portion of the film cartridge 4 is clamped between the driving roller 15 and the follower roller 17. Then, in Step 204, the control circuit 50 starts the operation of the roller driving device 16 and causes the roller driving device 16 to rotate the driving roller 15 in the counterclockwise direction.

Subsequently, the film cartridge 4 is moved upward in the state of being clamped between the driving roller 15 and the follower roller 17, by the rotation of the driving roller 15.

Figure 10:
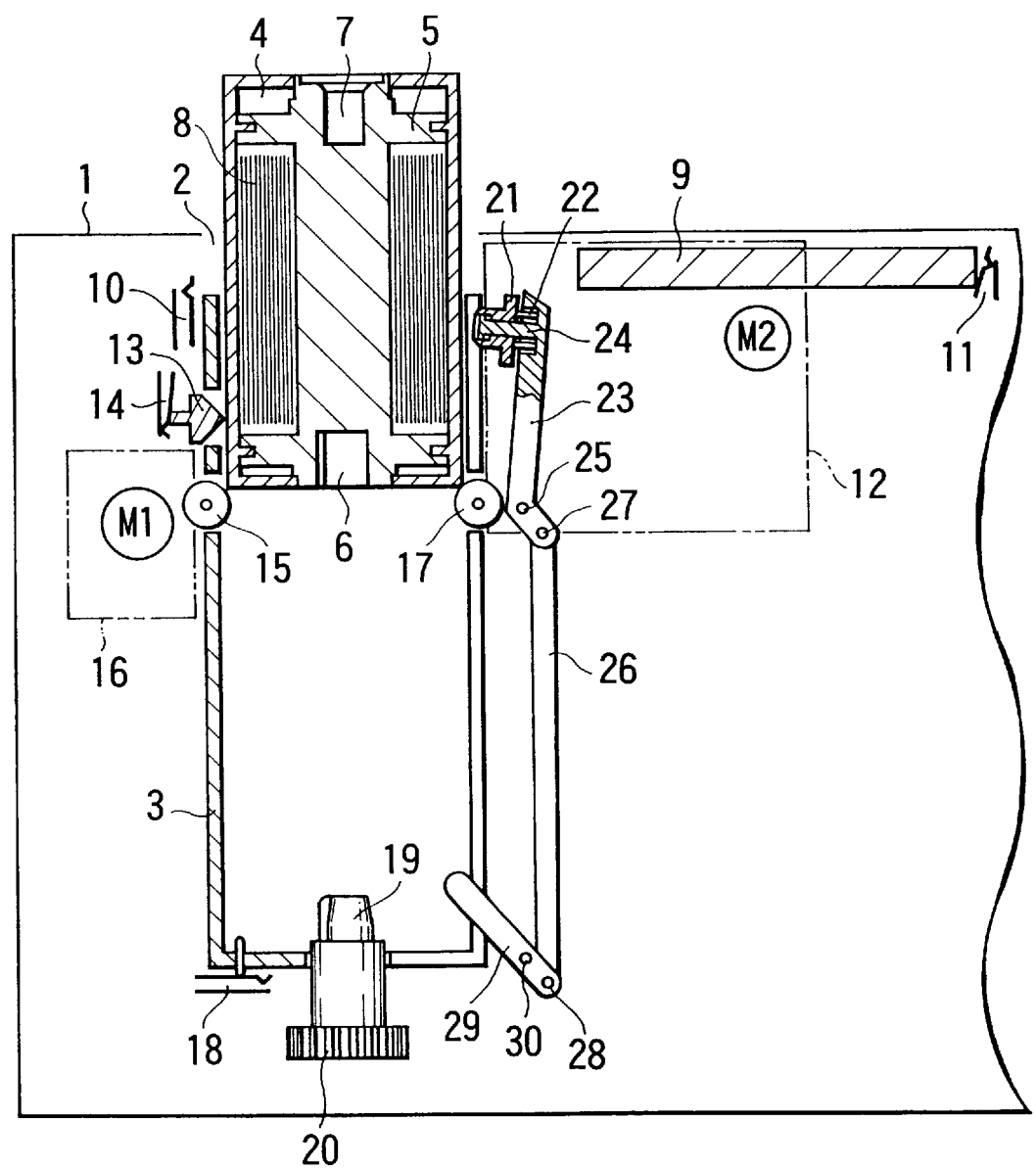
FIG. 10 is a diagrammatic view showing the other step of the operating process of the apparatus of FIG. 1.

Thus, the film cartridge 4 proceeds from the state of FIG. 6 to the state shown in FIG. 10. As shown in FIG. 10, the film cartridge 4 presses the insertion-of-cartridge detecting member 13 to turn on the insertion-of-cartridge detecting switch 14 (SW4), and moves up to a position away from the driving roller 15 and the follower roller 17 and stops in the state in which its top portion projects from the cartridge inserting port 2.

After that, as shown in FIG. 3, if the operator takes out the film cartridge 4, as by hand, the insertion-of-cartridge detecting member 13 is released from the pressure applied by the film cartridge 4 and is reset by the urging member (not shown) so that the insertion-of-cartridge detecting switch 14 is switched from the on state to the off state.

If the control circuit 50 detects in Step 205 that the insertion-of-cartridge detecting switch 14 (SW4) has been turned on, and then detects in Step 206 that the insertion-of-cartridge detecting switch 14 (SW4) has been turned off, the control circuit 50 stops the operation of the roller driving device 16 in Step 207. Then, the control circuit 50 starts its internal timer T in Step 208, and if the control circuit 50 determines in Step 209 that the timer T has counted predetermined time $T_0$ enough to take out the film cartridge 4 through the cartridge inserting port 2, as by hand, the process proceeds to Step 210, in which the control circuit 50 starts the operation of the lid driving device 12 to cause the lid driving device 12 to move the cartridge chamber lid 9 in the leftward direction. The support lever 23 rotates in the counterclockwise direction in interlocking relation to the leftward movement of the cartridge chamber lid 9, and the ejecting lever 29 also rotates in the counterclockwise direction. When the cartridge chamber lid 9 completes the closing operation as shown in FIG. 2, the closing-of-lid detecting switch 10 is turned on by being pressed by the cartridge chamber lid 9. If the control circuit 50 detects in Step 211 that the closing-of-lid detecting switch 10 has been turned on, the process proceeds to Step 212, in which the control circuit 50 stops the operation of the lid driving device 12 and brings the cartridge ejecting sequence to an end. Then, the process returns to Step 101, in which the control circuit 50 waits for an input to be supplied from the start switch 51 (SW1).

In this state, the ejecting lever 29 is located at the position shown in FIG. 2.

The individual components shown in schematic or block form in the drawings are all well-known in the camera arts and their specific construction and operation are not critical to the operation or best mode for carrying out the invention.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, although in the above-described embodiment the film cartridge is loaded or ejected by the pressure applied by the levers, the present invention is applicable to any other arrangement using an engagement member which engages with the film cartridge and moves it while moving together therewith, for example, an arrangement which moves the film cartridge by hooking a claw member or the like on it.

As a matter of course, according to the present invention, the rollers for cartridge loading or ejection which are used in the above-described embodiment may be replaced with another arrangement, such as an arrangement of the type which moves a film cartridge by using a friction against the film cartridge or an arrangement of the type which moves together with a film cartridge while clamping it.

In the present invention, as long as the loading movement ranges of at least two loading devices or the ejecting movement ranges of at least two ejecting devices overlap each other, such movement ranges can freely be determined.

Although in the above-described embodiment the film cartridge is moved for loading or ejection by the driving force of an electric motor, it may be moved by another type of electric driving force or another type of driving force such as a spring force, or it may also be moved partly or completely manually.

In addition, the present invention is not limited to the arrangement in which a film cartridge is loaded in the axial direction thereof as described above in connection with the embodiment.

The present invention can also be applied to even any image recording medium other than film.

The present invention can also be applied to a film cartridge of any type other than the film cartridge used in the above-described embodiment, a cartridge which contains an image recording medium other than film, any kind of cartridge other than such cartridges, or any other kind of loading matter such as batteries.

In the present invention, the software arrangement and the hardware arrangement of the circuit of the above-described embodiment may arbitrarily be replaced, as required.

The present invention can also be carried out by combining the above-described embodiment and its modifications or their technical elements, as required.

The present invention can also be applied to various types of cameras such as a single-lens reflex camera, a lens shutter camera or a video camera, optical apparatuses other than such cameras, apparatuses other than the optical apparatuses, apparatuses applied to the cameras or the optical or other apparatuses, or elements which constitute part of such apparatuses.

I claim:

1. An apparatus comprising:
   (A) a first unloading device which moves a cartridge from a loaded position to a first unloading position in an unloading direction; and
   (B) a second unloading device which moves the cartridge moved from the loaded position to the first unloading position by said first unloading device from the first unloading position to a second unloading position, wherein said second unloading device does not operate to discharge the cartridge when the cartridge is at the loaded position.

2. An apparatus according to claim 1, wherein said second unloading device includes a roller which moves the cartridge.

3. An apparatus according to claim 2, wherein said roller includes an elastic member.

4. An apparatus according to claim 1, wherein said first unloading device includes an engagement member which engages with the cartridge to move the cartridge, said engagement member moving together with the cartridge.

5. An apparatus according to claim 4, wherein said engagement member includes a lever.

6. An apparatus according to claim 1, wherein said second unloading device moves the cartridge in a loading direction to at least a first loading position.

7. An apparatus according to claim 6, further comprising a loading device which moves the cartridge moved in the loading direction by said second unloading device to at least a second loading position.

8. An apparatus according to claim 7, wherein said loading device includes a support member which supports an image-recording-medium feeding spool of the cartridge when the cartridge is in a loading-complete state.

9. An apparatus according to claim 7, wherein said loading device includes an engagement member which engages with the cartridge to move the cartridge, said engagement member moving together with the cartridge.

10. An apparatus according to claim 1, wherein said first unloading device includes a motor.

11. An apparatus according to claim 1, wherein said first unloading device includes an electric driving device.

12. An apparatus according to claim 1, wherein said second unloading device includes a motor.

13. An apparatus according to claim 1, wherein said second unloading device includes an electric driving device.

14. An apparatus according to claim 1, further comprising a cartridge chamber lid which associates with an operation of said first unloading device.

15. An apparatus according to claim 1, further comprising a control device which performs automatic driving control of an operation of said first unloading device.

16. An apparatus according to claim 1, further comprising a control device which performs automatic driving control of an operation of said second unloading device.

17. An apparatus according to claim 1, further comprising a control device which performs automatic driving control of operations of said first and second unloading devices.

18. An apparatus according to claim 1, further comprising a control device which performs sequential automatic driving control of operations of said first and second unloading devices.

19. An apparatus according to claim 1, further comprising a control device which performs automatic driving control of an operation of said first unloading device, an operation of said second unloading device and an operation of a cartridge chamber lid.

20. An apparatus according to claim 1, further comprising a control device which performs sequential automatic driving control of an operation of said first unloading device, an operation of said second unloading device and an operation of a cartridge chamber lid.

21. An apparatus according to claim 1, wherein said first unloading device moves the cartridge from at least a loading-complete position of the cartridge in the unloading direction.

22. An apparatus according to claim 7, wherein said loading device moves the cartridge in the loading direction to at least a loading-complete position of the cartridge.

23. An apparatus according to claim 1, wherein said apparatus includes a camera.

24. An apparatus according to claim 1, wherein the cartridge includes a film cartridge.

25. An apparatus comprising:
   (A) a roller which moves a cartridge in a loading direction to at least a first loading position; and
   (B) a loading device which moves the cartridge moved in the loading direction by said roller to at least a second loading position.

26. An apparatus according to claim 25, wherein said roller includes an elastic member.

27. An apparatus according to claim 25, wherein said loading device includes an engagement member which engages with the cartridge to move the cartridge, said engagement member moving together with the cartridge.

28. An apparatus according to claim 27, wherein said engagement member includes a lever.

29. An apparatus according to claim 25, wherein said loading device includes a support member which supports an image-recording-medium feeding spool of the cartridge when the cartridge is in a loading-complete state.

30. An apparatus according to claim 25, further comprising a motor which drives said roller.

31. An apparatus according to claim 25, further comprising an electric driving device which drives said roller.

32. An apparatus according to claim 25, wherein said loading device includes a motor.

33. An apparatus according to claim 25, wherein said loading device includes an electric driving device.

34. An apparatus according to claim 25, further comprising a cartridge chamber lid which associates with an operation of said loading device.

35. An apparatus according to claim 25, further comprising a control device which performs automatic driving control of an operation of said roller.

36. An apparatus according to claim 25, further comprising a control device which performs automatic driving control of an operation of said loading device.

37. An apparatus according to claim 25, further comprising a control device which performs automatic driving control of operations of said roller and said loading device.

38. An apparatus according to claim 25, further comprising a control device which performs sequential automatic driving control of operations of said roller and said loading device.

39. An apparatus according to claim 25, further comprising a control device which performs automatic driving control of an operation of said roller, an operation of said loading device and an operation of a cartridge chamber lid.

40. An apparatus according to claim 25, further comprising a control device which performs sequential automatic driving control of an operation of said roller, an operation of said loading device and an operation of a cartridge chamber lid.

41. An apparatus according to claim 25, wherein said loading device moves the cartridge in the loading direction to at least a loading-complete position of the cartridge.

42. An apparatus according to claim 25, wherein said apparatus includes a camera.

43. An apparatus according to claim 25, wherein the cartridge includes a film cartridge.

* * * * *

UNITED STATES PATENT AND TRADEMARK OFFICE
CERTIFICATE OF CORRECTION

PATENT NO. : 5,812,897
DATED : September 22, 1998
INVENTOR(S) : Tetsuya Nishio

It is certified that error appears in the above-identified patent and that said Letters Patent is hereby corrected as shown below:

Col. 1, line 6, Delete "Improvement" and insert --improvement--.

Signed and Sealed this

Eighteenth Day of May, 1999

Attest:

Attesting Officer

Q. TODD DICKINSON

Acting Commissioner of Patents and Trademarks